United States Patent
Reynolds et al.

(10) Patent No.: US 7,201,421 B2
(45) Date of Patent: Apr. 10, 2007

(54) REAR VEHICLE STORAGE SYSTEM

(75) Inventors: Brian J. Reynolds, Oxford, MI (US); Bruce Higgins, South Lyon, MI (US); Stephen Hawkins, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/056,913

(22) Filed: Feb. 11, 2005

(65) Prior Publication Data

US 2006/0181101 A1    Aug. 17, 2006

(51) Int. Cl.
 *B60R 7/02* (2006.01)
(52) U.S. Cl. ............... 296/37.5; 296/37.8; 296/37.14; 296/37.16; 224/400
(58) Field of Classification Search ............... 296/37.1, 296/37.8, 37.2, 37.5, 37.14, 37.16; 224/545, 224/549, 400
See application file for complete search history.

(56) References Cited

U.S. PATENT DOCUMENTS

| | | | |
|---|---|---|---|
| 1,171,198 A | | 2/1916 | Hellberg |
| 1,661,188 A | | 3/1928 | Matthews |
| 4,189,056 A | | 2/1980 | Majewski |
| 4,226,348 A | | 10/1980 | Dottor et al. |
| 5,340,183 A | * | 8/1994 | Horian ............... 296/24.4 |
| 5,535,931 A | | 7/1996 | Barlow et al. |
| 5,570,921 A | * | 11/1996 | Brooker ............... 296/37.5 |
| 5,626,380 A | | 5/1997 | Elson et al. |
| 5,683,132 A | * | 11/1997 | Danzo et al. ............... 296/37.6 |
| 5,685,470 A | | 11/1997 | Moore |
| 5,715,978 A | | 2/1998 | Ackeret |
| 5,855,310 A | | 1/1999 | Van Ert et al. |
| 5,915,777 A | | 6/1999 | Gignac et al. |
| 6,015,178 A | | 1/2000 | Haack |
| 6,050,202 A | | 4/2000 | Thompson |
| 6,092,708 A | | 7/2000 | Rand |
| 6,135,527 A | | 10/2000 | Bily |
| 6,149,040 A | | 11/2000 | Walker |
| 6,176,535 B1 | | 1/2001 | Chaloult et al. |
| 6,241,137 B1 | | 6/2001 | Corr |
| 6,247,741 B1 | * | 6/2001 | Seel et al. ............... 296/37.14 |
| 6,253,943 B1 | | 7/2001 | Spykerman et al. |
| 6,254,162 B1 | * | 7/2001 | Faber et al. ............... 296/37.6 |
| 6,276,583 B1 | | 8/2001 | Tourneur |
| 6,290,277 B1 | * | 9/2001 | Spykerman et al. ..... 296/37.16 |
| 6,296,289 B1 | | 10/2001 | Gehring et al. |
| 6,308,873 B1 | * | 10/2001 | Baldas et al. ............... 224/281 |
| 6,338,518 B1 | | 1/2002 | D'Annunzio et al. |
| 6,375,055 B1 | | 4/2002 | Spykerman et al. |

(Continued)

FOREIGN PATENT DOCUMENTS

DE          40 15 556          11/1990

(Continued)

*Primary Examiner*—Jason Morrow
(74) *Attorney, Agent, or Firm*—MacMillan, Sobanski & Todd, LLC

(57) ABSTRACT

A vehicle storage assembly for a vehicle cargo area includes a base defining a floor of the storage assembly and a storage panel attached to said base. At least a portion of the storage panel is movable relative to the base by a living hinge. The storage panel is movable between a stowed position and a deployed position for dividing at least a portion of the vehicle cargo area.

17 Claims, 4 Drawing Sheets

U.S. PATENT DOCUMENTS

| | | |
|---|---|---|
| 6,481,773 B1 | 11/2002 | Salani et al. |
| 6,609,744 B2 * | 8/2003 | Gehring et al. ............ 296/37.5 |
| 6,623,059 B2 | 9/2003 | Gehring et al. |
| 6,637,819 B2 | 10/2003 | Tame |
| 6,676,184 B2 | 1/2004 | Gehring et al. |
| 6,676,185 B2 | 1/2004 | Gehring et al. |
| 6,682,118 B2 * | 1/2004 | Ryan ...................... 296/37.16 |
| 6,752,304 B1 * | 6/2004 | Hotary et al. ............ 296/37.14 |
| 2002/0006317 A1 | 1/2002 | Hofmann et al. |
| 2002/0006847 A1 | 1/2002 | Sagara et al. |
| 2002/0014777 A1 | 2/2002 | Gehring et al. |
| 2002/0047032 A1 | 4/2002 | Schlecht |
| 2002/0079728 A1 | 6/2002 | Tame |
| 2002/0179663 A1 | 12/2002 | Moore et al. |
| 2002/0190535 A1 | 12/2002 | Gehring et al. |
| 2003/0071039 A1 * | 4/2003 | Spykerman et al. ........... 220/6 |
| 2003/0080125 A1 | 5/2003 | Cassani |
| 2003/0090120 A1 | 5/2003 | Barber et al. |
| 2003/0090121 A1 | 5/2003 | Gehring et al. |
| 2003/0209919 A1 | 11/2003 | Gehring et al. |
| 2003/0214144 A1 | 11/2003 | Gehring et al. |
| 2003/0218347 A1 | 11/2003 | Gehring et al. |
| 2004/0020957 A1 | 2/2004 | Poliquin et al. |
| 2004/0135390 A1 | 7/2004 | Gammon |
| 2004/0140334 A1 | 7/2004 | Drane |
| 2005/0087530 A1 * | 4/2005 | Svenson ........................ 220/6 |
| 2006/0022479 A1 * | 2/2006 | Mulvihill et al. ........ 296/37.16 |

FOREIGN PATENT DOCUMENTS

| | | |
|---|---|---|
| DE | 200 20 068 U1 | 4/2002 |
| DE | 103 05 906 A1 | 9/2004 |
| EP | 1 296 853 B1 | 12/2004 |
| GB | 2 384 234 A | 7/2003 |
| JP | 2000-318529 | 11/2000 |
| JP | 2000-335317 | 12/2000 |

* cited by examiner

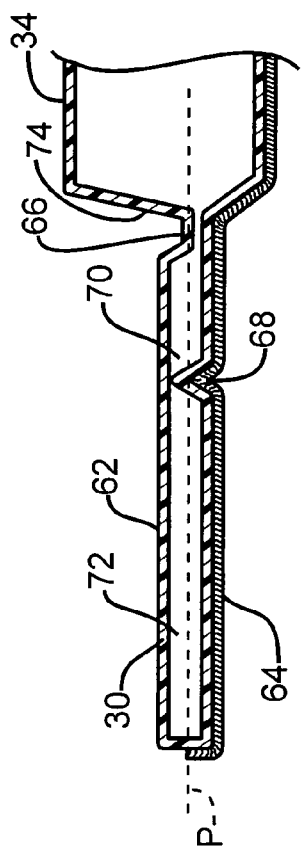
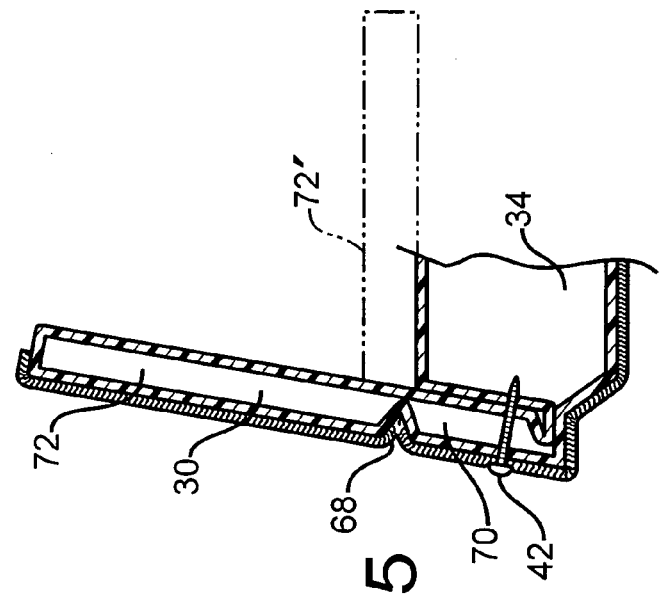
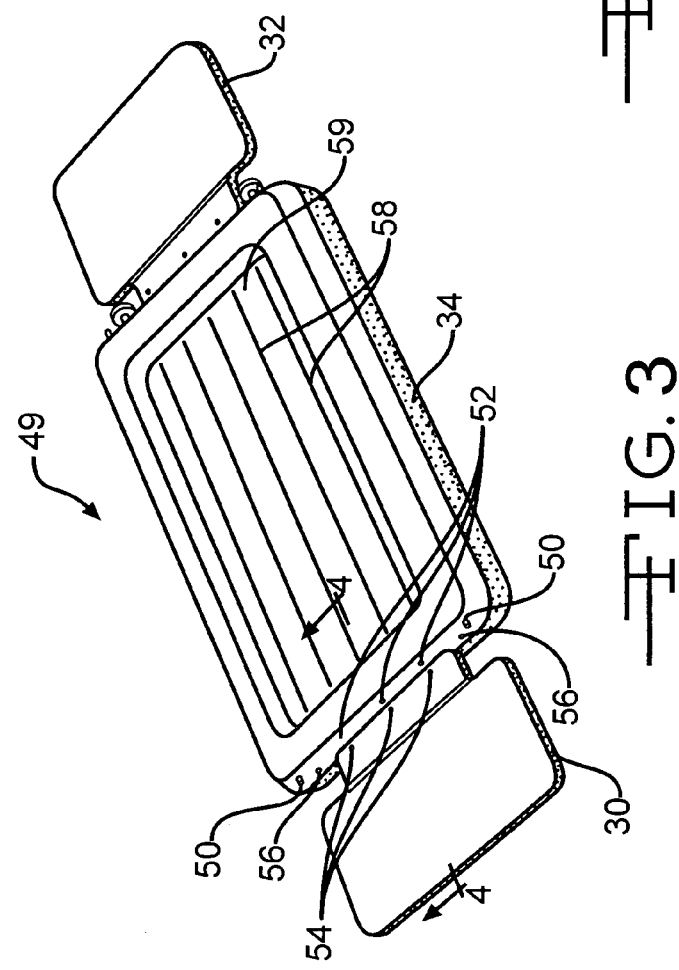

REAR VEHICLE STORAGE SYSTEM

BACKGROUND OF THE INVENTION

This invention relates in general to motor vehicles and, more particularly, to a storage assembly for motor vehicle cargo areas and trunk compartments which reduces the risk that cargo will shift, slide, or roll about the cargo area and trunk compartment during the operation of the motor vehicle.

Most motor vehicles are provided with cargo areas and trunk compartments for transporting and storing cargo. Cargo areas and trunk compartments are generally defined by a horizontal load surface extending between the motor vehicle side panels and the rearmost seat and rear end of the motor vehicle. The cargo transported and stored on the load surface typically shifts, slides, or rolls about the load surface in response to the motion of the motor vehicle induced by accelerating, braking, and turning.

It is desirable to prevent cargo from shifting about the load surface in an effort to prevent cargo from spilling or from being damaged when being transported or stored. It is also often desirable to separate various cargo to prevent the various cargo from intermixing and/or damaging one another.

Of recent popularity are cargo nets. Such nets are usually formed from flexible elastic cords having hooks or other fasteners that cooperate with eyes strategically located in the motor vehicle cargo area or trunk compartment. Such nets are limited in their applications. They fail to provide a rigid structure for receiving fragile cargo. Fastening the net can require the motor vehicle operator or passenger to bend and stretch into the cargo area or trunk compartment. Moreover, deployment of the net may require tension over the cargo that can crush and damage fragile cargo.

Various organizing arrangements have been proposed for use in motor vehicle cargo areas and trunk compartments. Such arrangements include partitions or racks that divide the cargo area or trunk compartment into a plurality of discrete storage areas. Some arrangements include partitions that are collapsible to allow the arrangement to be folded and stored in a compact form. The partitions of some of these arrangements may be secured to the vehicle by metal hinges. These arrangements may be expensive to manufacture, especially in the secondary market, and may be cumbersome to assemble. Moreover, such arrangements may vibrate during operation of the vehicle generating undesirable noise.

A storage apparatus is needed that permits cargo to be transported and stored in a motor vehicle without shifting or spilling that does not generate undesirable noise during vehicle operation.

BRIEF SUMMARY OF THE INVENTION

The present invention is directed towards a motor vehicle storage assembly that meets the foregoing needs. The vehicle storage assembly includes for a vehicle cargo area includes a base defining a floor of the storage assembly and a storage panel attached to said base. At least a portion of the storage panel is movable relative to the base by a living hinge. The storage panel is movable between a stowed position and a deployed position for dividing at least a portion of the vehicle cargo area.

BRIEF DESCRIPTION OF THE DRAWINGS

FIG. 3 is an enlarged perspective view of a portion of the storage assembly shown in FIGS. 1 and 2 shown in a molded position.

FIG. 4 is an enlarged cross-sectional view of a portion of the storage assembly shown in FIG. 3 taken along line 4—4.

FIG. 5 is an enlarged cross-sectional view of the portion of the storage assembly shown in FIG. 4 in an installed position.

DETAILED DESCRIPTION OF THE PREFERRED EMBODIMENT

Figure 1:
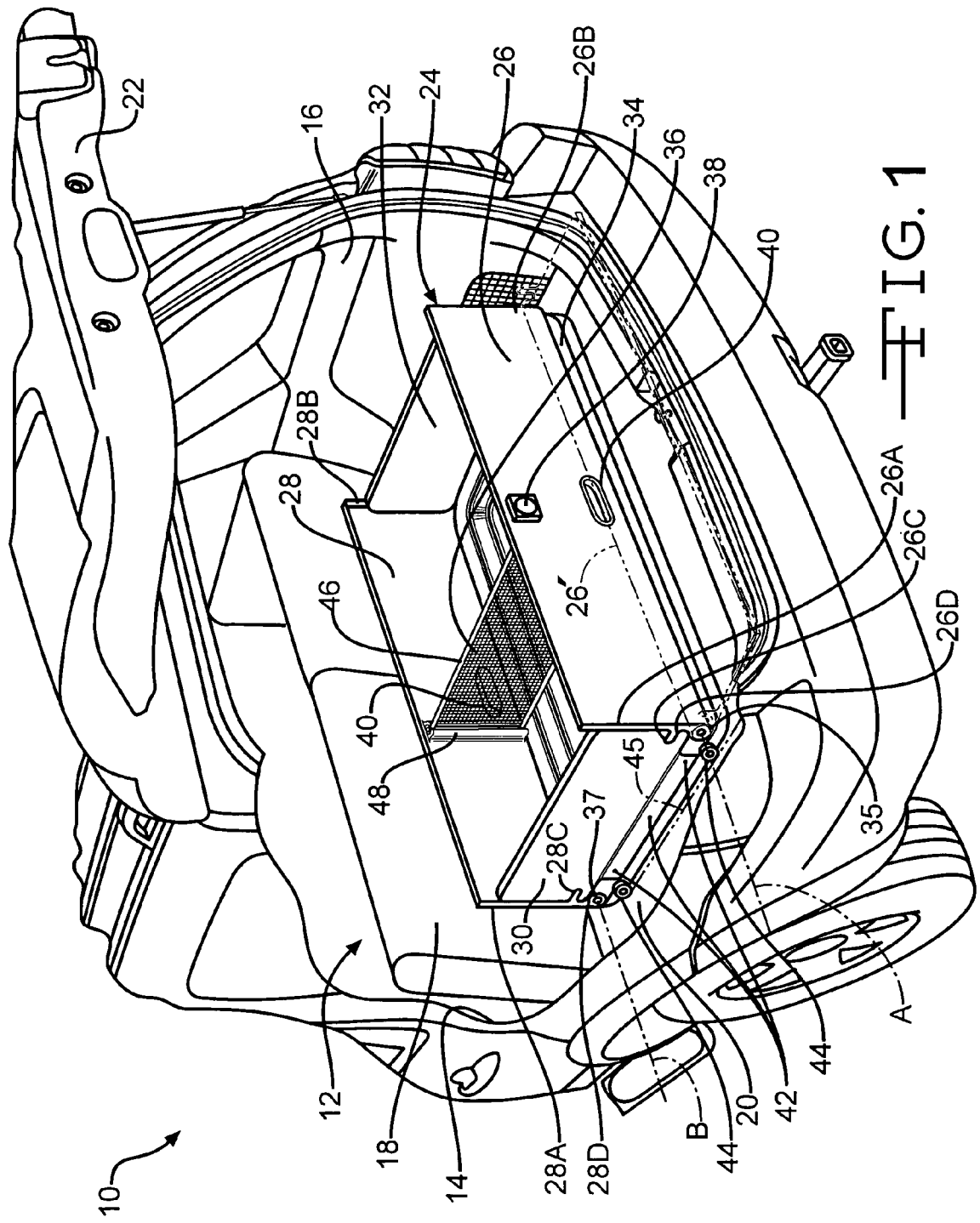
FIG. 1 is a rear perspective view of a motor vehicle cargo area with the motor vehicle cargo hatch opened for clarity and including a storage assembly in a deployed position in the motor vehicle cargo area, in accordance with the present invention.

Referring now to the drawings, there is illustrated in FIG. 1 a motor vehicle 10 having a cargo area or truck compartment 12 for storing and transporting cargo. The illustrated motor vehicle 10 and cargo area 12 are, in large measure, conventional in the art and are intended merely to illustrate one environment in which this invention may be used. Thus, the scope of this invention is not intended to be limited for use with the specific structure for the motor vehicle 10 or cargo area 12 illustrated in FIG. 1 or with motor vehicle cargo areas in general. On the contrary, as will become apparent below, this invention may be used in any desired environment for the purposes described below.

The cargo area 12 is generally bounded by opposing laterally spaced walls, each comprising interior components 14, 16 and a rear seat 18 or a wall of a trunk compartment, illustrated schematically in FIG. 1. A generally horizontal floor 20 or load surface is provided for supporting cargo. A cargo hatch or trunk lid 22 is generally provided to conceal the cargo area 12, however such is illustrated in an open position in FIG. 1 for clarity purposes.

A storage assembly, indicated generally at 24, is adapted to be retained in the cargo area 12. As illustrated, the storage assembly 24 generally includes a first cover panel 26 and a second cover panel 28, although such is not required. It will be appreciated that the storage assembly 24 may have any number of cover panels, including a single cover panel or no cover panel at all. As illustrated, the storage assembly 24 further includes a first storage panel 30 and a second storage panel 32, although such is not required. It will be appreciated that the storage assembly 24 may have any number of storage panels, including a single storage panel. The storage assembly 24 may further include a base 34 and a net 36.

Figure 2:
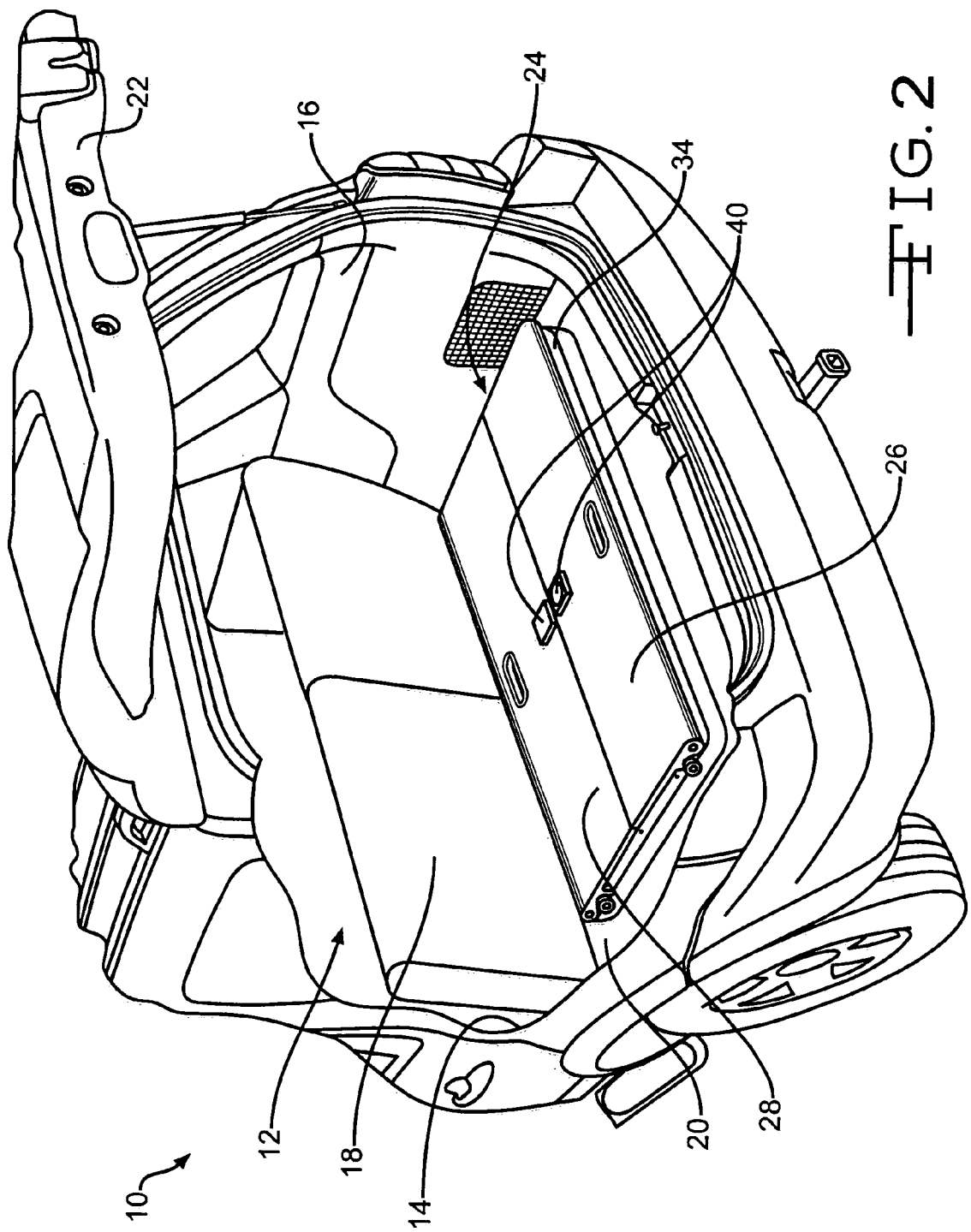
FIG. 2 is a rear perspective view of the motor vehicle cargo area and storage assembly shown in FIG. 1 shown in a stowed position.

The first cover panel 26 may be pivotably mounted to the base 34 by a first pin member 35 and the second cover panel 28 may be pivotably mounted to the base 34 by a second pin member 37. However, it will be appreciated that the cover panels 26, 28 may be mounted to the base 34 or to any portion of the cargo area 12 in any manner. As illustrated, the first cover panel 26 is mounted to the base 34 about an axis A. As further illustrated, the cover panel 28 is mounted to the base 34 about an axis B. Each of the cover panels 26, 28 are pivotable to an open position, as shown in FIG. 1, in which each of the cover panels 26, 28 are generally perpendicular to the base 34. Each of the cover panels 26, 28 are also pivotable to a closed position, as shown in FIG. 2, in which each of the cover panels 26, 28 are generally parallel to the base 34. The first cover panel 26 may be further pivotable to an extended position as illustrated by phantom lines 26' in FIG. 1, although such is not required. It will be appreciated that either, both or neither of the cover panels 26, 28 may be pivotable to an extended position. The cover panels 26, 28 extend generally parallel to the base 34 and extend generally outwardly from the assembly 24 when in the extended position. It will be appreciated that the first cover panel 26 may extended outwardly from the assembly 24, such that the first cover panel 26 extends outwardly from the rear of the vehicle 10. In the extended position, articles (not shown) may be stored on top of the first cover panel 26 to be easily accessible to a user outside of the vehicle 10. In the open position, at least one of the cover panels 26, 28 divide the cargo area 12. At least one of the cover panels 26, 28 may include a locking mechanism 38. The locking mechanism 36 may selectively limit the rotation of at least one of the cover panels 26, 28. In a preferred embodiment, the locking mechanism 38 may prevent rotation of the cover panels 26, 28 from the closed position without disengagement of the locking mechanism 38. At least one of the cover panels 26, 28 may further include a handle 40. The handle 40 may assist a user in positioning at least one of the cover panels 26, 28 or the assembly 24 within the vehicle 10, as will be described herein. As illustrated, the first cover panel 26 may be contoured at outer opposing sides 26a and 26b to respectively form flanges 26c and recesses 26d, which will be described below. As further illustrated, the second cover panel 28 may also be contoured at outer opposing sides 28a and 28b to respectively form flanges 28c and recesses 28d, which will also be described below.

The storage panels 30, 32 may be pivotably mounted to the base 30 by at least one fastener 42, as will be described in more detail below. It will be appreciated that the storage panels 30, 32 may be pivotably mounted to any portion of the cargo area 12. Each of the storage panels 30, 32 are pivotable to a deployed position, as shown in FIG. 1, in which each of the storage panels 30, 32 are generally perpendicular to the base 34. Each of the storage panels 30, 32 are also pivotable to a stowed position, in which each of the storage panels 30, 32 are generally parallel to the base 34, as will be described in further detail below.

The base 34 may be positioned within the cargo area 12, such that the base 34 is supported by a horizontal surface defining the cargo area, although such is not required. The base 34 may be formed integral to any horizontal portion of the motor vehicle 10 and additionally, or alternatively, may form a portion of the floor 20 of the cargo area 12. It will also be appreciated that the base 30 may rest on the floor 20 and may be removably secured to the floor 20. It will also be appreciated that the base 30 may include a plurality of rollers 44 rotatably attached thereto, although such is not required. The plurality of rollers 44 may allow the base 30 and assembly 24 to roll within the cargo area 12. The rollers 44 may roll against the floor 20 allowing a user to move the assembly 24 relative to the floor 20. For example, a user may desire to move the assembly 24 closer to the cargo hatch 22 to load or unload storage items (not shown) from the assembly 24. It may also be desirable to move the assembly 24 closer to the cargo hatch 22 and move the first cover panel 26 in the extended position, such that the first cover panel 26 extends generally extends outwardly from the assembly 24 and the cargo area 12 to act as a tray at the rear of the vehicle 10. It will be appreciated that the first cover panel 26 may extend outside of the cargo area 12 when the first cover panel 26 is in the extended position and the assembly is positioned near the rear of the cargo area 12. The rollers 44 may cooperate with a track, indicated schematically at 45, within the floor 20 to control the movement of the assembly 24, although such is not required. It will further be appreciated that the rollers 44 and/or the track 45 may include a locking mechanism (not shown) to limit the rotation of the rollers 44 relative to the assembly 24 to control the movement of the assembly 24. As best shown in FIG. 2, each of the plurality of rollers 44 may extend through the respective recesses 26d, 28d formed through the outer opposing sides of the cover panels 26, 28. Each of the flanges 26c and flanges 28c of the cover panels 26, 28 may extend about the respective rollers 44 to aesthetically cover portions of the respective rollers 44 and any associated mechanism from view from the cargo area 12.

As illustrated in FIG. 1, the net 36 may include a frame member 46, although such is not required. The frame member 46 may extend about a portion of the periphery of the net 36. At least a portion of the frame member 46 may be used to attach the net 36 to the assembly 24. As illustrated, the net 36 extends between the first cover panel 26 and the second cover panel 28. As illustrated with reference to the second cover panel 28 in FIG. 1, a portion of the frame member 46 is received within an anchor member 48 of the second cover panel 28, although such is not required. It will be appreciated that the net 36 may be attached to the assembly 24 in any manner. In a preferred embodiment, the net 36 is attached to the first cover panel 26 and the second cover panel 28 to facilitate supporting the first cover panel 26 to the second cover panel 28 in the deployed position. In this embodiment, the net 36 may prevent either the first cover panel 26 or the second cover panel 28 from rotating outwardly away from one another when both cover panels 26, 28 are in the extended position.

Referring now to FIG. 3, a molded storage subassembly 49 including the base 34 and storage panels 30, 32 is shown prior to assembly in the storage assembly 24. The base 34 may include a first plurality of apertures 50 corresponding to the pins 35, 37 to facilitate mounting the respective cover panels 26, 28 to the base 34. The base 34 may also include a second plurality of apertures 52 corresponding to the respective plurality of fasteners 42 for securing each of the storage panels 30, 32 to the base 34. Each of the first storage panel 30 and the second storage panel 32 includes a plurality of apertures 54 corresponding to the respective plurality of fasteners 42 and plurality of apertures 52 to facilitate the attachment of the storage panels 30, 32 to the base 34. The base 34 may additionally include a third plurality of apertures 56 for facilitating the attachment of the plurality of rollers 44 to the base 34, although such is not required. The base 34 may include strengthening ribs 58 formed on a storage surface 59, although such is not required. In a preferred embodiment, the first storage panel 30, the second storage panel 32, and the base 34 are integrally formed as a molded subassembly 49. As illustrated in FIG. 3, the first storage panel 30 and the second storage panel 32 are in a molded position relative to the base 34, as will be described below.

Referring now to FIG. 4, a portion of the molded storage subassembly 49 is shown including the first storage panel 30 and the base 34. The molded subassembly 49 may be formed by any suitable molding technique, such as blow molding, injection molding, or twin sheet/compression molding. As illustrated, the first storage panel 30 is in the molded position relative to the base 34. An exemplary mold parting line for the subassembly 49 is indicated at line P. As illustrated, the subassembly 49 is formed of a base material 62 and an outer layer 64, although such is not required. It will be appreciated that the subassembly 49 may be formed from a single material or any number of materials formed together in any manner. It will be appreciated that any portion of the subassembly 49 may be formed from a laminate, such as a tri-laminate having a foam layer disposed between two hard layers. It will further be appreciated that the outer layer 64 may extend about only a portion of the subassembly 49. For example, the outer layer 64 may extend over only the portion of the subassembly 49 comprising the first storage panel 30 and the second storage panel 32. In a preferred embodiment, the outer layer 64 is a flexible material. In a more preferred embodiment, the outer layer 64 is a textile, polymer, or fabric, such as carpet, vinyl, rubber, cloth, thermoplastic olefin (TPO), or any other textile material or combination thereof. It will further be appreciated that although both the first storage panel 30 and the base 34 are each illustrated as hollow in FIGS. 4 and 5, either of the first storage panel 30 and the base 34 may be molded as generally solid or generally hollow members in any combination with one another in accordance with the present invention.

A first living hinge 66 is formed between the first storage panel 30 and the base 34. The first living hinge 66 may be formed by a flexible portion of the first storage panel 30. The first living hinge 66 may be formed by a notch of relatively smaller thickness of the material comprising the first storage panel 30. It will be appreciated that the first living hinge 66 may be a notch formed in the base material 62. It will also be appreciated that the first living hinge 66 may be a portion of the first storage panel 30 having a lesser amount of base material 62 relative to the remaining portion of the first storage panel 30 or a portion of the first storage panel 30 that is essentially devoid of the base material 62. It will further be appreciated that the first living hinge 66 may be formed by a portion of the outer layer 64 that is adjacent to such a notch formed in, portion having a lesser amount of, or portion devoid of the base material 62.

A second living hinge 68 is formed in the first storage panel 30. The second living hinge 68 may be formed by a flexible portion of the first storage panel 30. The second living hinge 68 may be formed by a notch of relatively smaller thickness of the material comprising the first storage panel 30. It will be appreciated that the second living hinge 68 may be a notch formed in the base material 62. It will also be appreciated that the second living hinge 68 may be a portion of the first storage panel 30 having a lesser amount of base material 62 relative to the remaining portion of the first storage panel 30 or a portion of the first storage panel 30 that is essentially devoid of the base material 62. It will further be appreciated that the second living hinge 68 may be formed by a portion of the outer layer 64 that is adjacent to such a notch formed in, portion having a lesser amount of, or portion devoid of the base material 62.

The first living hinge 66 facilitates attachment of the first storage panel 30 to the base 34. The second living hinge 68 divides the first storage panel 30 into an attachment portion 70 and a flange portion 72. As shown in FIG. 5, the first storage panel 30 is rotated about the living hinge 66, such that the first storage panel 30 extends generally perpendicular to the storage surface 59 of the base 34. The attachment portion 70 of the first storage panel 30 is positioned generally parallel to an end surface 74 of the base 34. The plurality of apertures 54 of the first storage panel 30 and the corresponding plurality of apertures 52 in the base 34 may be formed during the molding process or after the molding process before or after the first storage panel 30 is rotated perpendicular to the base 34. Regardless of the method of forming the apertures 52 and the apertures 54, the apertures 52 and the apertures 54 are aligned with one another, respectively, when the first storage panel 30 is positioned relative to the base 34 as shown in FIG. 5. The plurality of fasteners 42 are respectively inserted within the plurality of apertures 52 and plurality of apertures 54 to fixedly secure the first storage panel 30 to the base 34. The first storage panel 30 is then in the installed position relative to the base 34. In an alternate embodiment, it will be appreciated that the attachment portion 70 of the first storage panel 30 may be incorporated within the first living hinge 66.

As shown in FIG. 5, once the first storage panel 30 has been attached to the base 34, the flange portion 72 of the first storage panel 30 extends outwardly from the base 34 in a deployed position as previously shown in FIG. 1. As shown by phantom lines 72' in FIG. 5, the flange portion 72 of the first storage panel 30 may be pivoted about the second living hinge 68, so that the flange portion 72 of the first storage panel 30 extends generally parallel to the base 34 in a stowed position. It may be desirable to pivot the flange portion 72 of the first storage panel 30 to the stowed position so that the entire storage assembly 24 may be stowed as illustrated in FIG. 2.

In a preferred embodiment, the first storage panel 30, the second storage panel 32, and the base 34 are integrally molded with the living hinge 66 disposed between the first storage panel 30 and the base 34 and between the second storage panel 32 and the base 34 in an orientation as shown in FIG. 3 and as described above for the first storage panel 30. In an alternate embodiment, the first cover panel 26 and the second cover panel 28 are also integrally molded with the base 34, in a manner similar to that described above for the first storage panel 30. In this alternate embodiment, the base 34 is thus surrounded by four panels integrally formed thereto by a living hinge. It will be appreciated that the base 34 may be integrally formed with or attached to any number of panels in accordance with the present invention.

It will be appreciated that in an alternate embodiment, the first storage panel 30 may be formed separately from the base 34 without a living hinge formed between the first storage panel 30 and the base 34. The first storage panel 30 may be attached to the base 34 with fasteners 42 in a manner similar to that described above. It will further be appreciated that the second storage panel 32 may be formed and attached to the base 34 according to any of the methods described above for the first storage panel 30.

Figure 6:
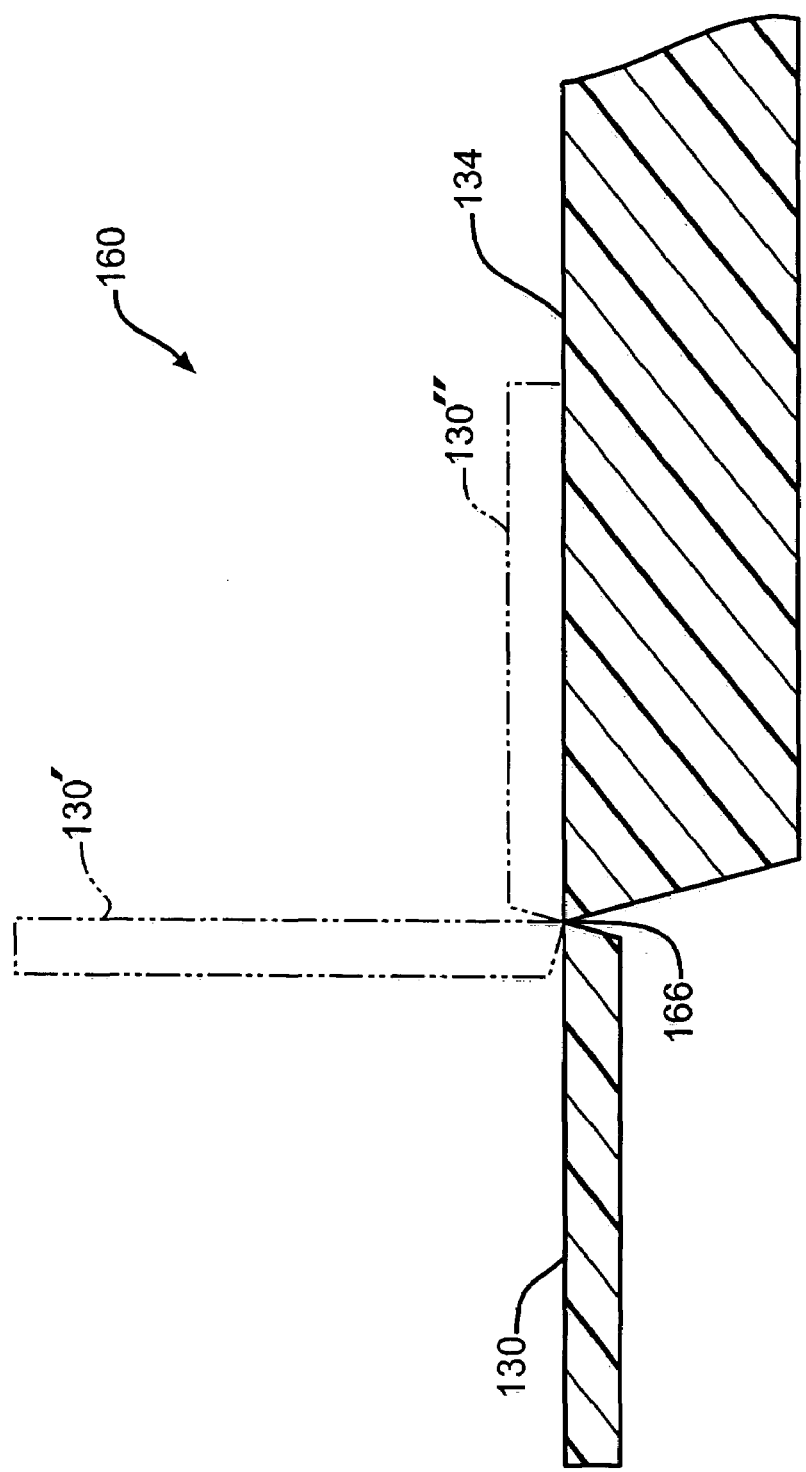
FIG. 6 is an enlarged cross-section view of a second embodiment of a portion of a storage assembly in accordance with the present invention.

Referring now to FIG. 6, there is illustrated a second embodiment of a molded storage subassembly, indicated generally at 149, in accordance with the present invention. The storage subassembly 149 is similar to the storage subassembly 49 and generally only the components that differ will be described herein. Many of the components of the storage subassembly 149 as illustrated in FIG. 6 are similar in structure and function to corresponding components of the storage subassembly 49 as illustrated in FIGS. 3 through 5. Therefore, such corresponding components are indicated by similar reference number in these Figures, but with the components of the storage subassembly 149 as illustrated in FIG. 6 having the addition of 100 to each reference number.

The storage subassembly 149 includes a storage panel 130 and a base 134. However, it will be appreciated that the storage subassembly 149 may include any number of panels as described above for the storage subassembly 49. The storage panel 130 and the base 134 are formed integrally. A living hinge 166 is formed between the storage panel 130 and the base 134 that allows the storage panel 130 to pivot relative to the base 134 between the molded position as shown in FIG. 6, the deployed position indicated by phantom lines 130', and the stowed position indicated by phantom lines 130".

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A storage assembly for a vehicle cargo area comprising:
   a base;
   a storage panel;
   a first living hinge provided between said base and said storage panel; and
   a second living hinge dividing said storage panel into a flange portion and an attachment portion, said attachment portion disposed between said base and flange portion, said attachment portion having parallel first and second opposed edges spaced from one another, wherein said first living hinge is adjacent said first opposed edge and said second living hinge is adjacent said second opposed edge, said flange portion being pivotable relative to said attachment portion about said second living hinge such that said flange portion is movable between a stowed position and a deployed position for dividing at least a portion of the vehicle cargo area, said attachment portion adapted to be attached to said base; and
   a cover panel connected to said base and movable to an extended position in which said cover panel extends generally parallel to said base and extends outwardly from said storage assembly.

2. The storage assembly according to claim 1, wherein said base and said storage panel are formed integrally.

3. The storage assembly according to claim 1, wherein said first living hinge is adapted to be flexed to position said attachment portion adjacent said base to be fixedly attached thereto.

4. The storage assembly according to claim 1, wherein said vehicle storage assembly includes a pair of storage panels attached to opposed ends of said base, at least a portion of each of said storage panels movable relative to said base by a living hinge, each of said storage panels movable between a stowed position and a deployed position for dividing at least a portion of the vehicle cargo area.

5. The storage assembly according to claim 4, wherein said pair of storage panels and said base are formed integrally.

6. The storage assembly according to claim 1, wherein said vehicle storage assembly includes a plurality of storage panels, each of said storage panels divided into a flange portion and an attachment portion by a living hinge, each of said attachment portions of said storage panels being adapted to be mounted to a base of a vehicle such that each of said flange portions, respectively, is positionable to a stowed position, and a deployed position for dividing at least a portion of the vehicle cargo area.

7. The storage assembly according to claim 1, wherein said flange portion of said storage panel is pivotally mounted such that said storage panel is rotatable between said stowed position in which said flange portion of said storage panel is generally parallel to a load surface of said vehicle and a deployed position in which said flange portion of said storage panel is generally perpendicular to said load surface of said vehicle.

8. The storage assembly according to claim 1, wherein said cover panel is positionable between a closed position and an open position for dividing at least a portion of the vehicle cargo area.

9. The storage assembly according to claim 8, wherein said cover panel extends across the vehicle cargo area generally perpendicular to said storage panel when said cover panel is in said open position and said storage panel is in said deployed position.

10. The storage assembly according to claim 8, wherein said cover panel extends across the vehicle cargo area generally parallel to said base and said storage panel when said cover panel is in said closed position and said storage panel is in said stowed position.

11. The storage assembly according to claim 8, wherein said cover panel extends across one of the length and the width of the vehicle cargo area to divide the vehicle cargo area.

12. The storage assembly according to claim 8, wherein said cover panel and said base are formed integrally.

13. The storage assembly according to claim 1, wherein said storage panel extends across one of the length and the width of the vehicle cargo area to divide the vehicle cargo area.

14. The storage assembly according to claim 1, wherein an interior component of a vehicle comprises said base.

15. The storage assembly according to claim 1, wherein said base is removably attached to an interior component of a vehicle.

16. The storage assembly according to claim 1, wherein said base and said storage panel are formed from a blow molding operation forming an interior cavity therein.

17. The storage assembly according to claim 1 further including a plurality of rollers mounted on said assembly.

* * * * *